Nov. 9, 1943.    W. H. BENNETT    2,333,975
METHOD AND APPARATUS FOR INDICATING STORM AREAS
Filed July 11, 1941.    2 Sheets-Sheet 1

INVENTOR.
WILLARD H. BENNETT
BY
*Charles B. Belknap*
ATTORNEY

Nov. 9, 1943.   W. H. BENNETT   2,333,975
METHOD AND APPARATUS FOR INDICATING STORM AREAS
Filed July 11, 1941   2 Sheets-Sheet 2

INVENTOR.
WILLARD H. BENNETT
BY Charles B Belknap
ATTORNEY

Patented Nov. 9, 1943

2,333,975

UNITED STATES PATENT OFFICE 2,333,975

METHOD AND APPARATUS FOR INDICATING STORM AREAS

Willard H. Bennett, Newark, Ohio, assignor, by mesne assignments, to Games Slayter, Newark, Ohio Application July 11, 1941, Serial No. 402,039

14 Claims. (Cl. 177—311)

This invention relates to a method and apparatus for detecting, as well as indicating the location of electrical storm conditions.

More particularly the invention contemplates an installation on aircraft which will detect the presence of electrical storm conditions in the vicinity of flight and will indicate the location of the storm area with respect to the aircraft in ample time to enable the necessary manipulation of the aircraft to avoid contact with the storm area.

It is one of the principal objects of this invention to improve the safety factor of so-called instrument flying by minimizing the tendency for existing electrical conditions to interfere with radio reception. Generally speaking, interference with radio reception on an aircraft is due principally to true precipitation charging and a phenomenon commonly known as cross field corona.

When aircraft is flown into an area of charged particles, an electrical charge is deposited on the aircraft, and this condition may be defined as precipitation charging. The current, resulting from the electrical charge on the aircraft, is discharged from the latter and if this discharge is not controlled, it may reach such proportions as to cause interference with radio reception aboard the aircraft. The Willard H. Bennett et al. copending application, Serial No. 402,040, filed July 11, 1941, is directed to a method and apparatus for controlling this type of discharge so that it does not seriously interfere with radio reception.

Cross field corona is very different from precipitation charging and is usually much more serious. When aircraft is flying near a charged cloud, there is an electrical field applied to the aircraft which is the source of current both to and from the aircraft, although the net electrical charge on the aircraft may be zero. These currents may be very large and are a source of radio interference.

With the above in view, the present invention further contemplates equipment readily applicable to aircraft for detecting and indicating the location of intense cross electrical field zones long before the charged area is able to cause sufficient cross field corona on the aircraft to seriously interfere with radio reception. In other words, equipment constructed in accordance with this invention will enable the pilot of the aircraft to navigate around highly charged areas and thereby avoid dangerous risks that had to be taken in the past, due to the lack of equipment of this character.

Another object of this invention is to provide equipment which, in addition to detecting the presence of high electrical cross fields in the vicinity of flight and indicating the location of such fields, further functions to discharge current, resulting from precipitation charging, in a controlled manner so that this discharge of current does not seriously interfere with radio reception. The dissipation of precipitation charge from the aircraft in a controlled manner not only avoids radio interference from this condition but, also, cancels the effect of precipitation charging on the detecting and indicating means.

In accordance with this invention, the above objects are realized by the strategic location of points or sharp pointed rods on the aircraft. It has been found that points require fields above a certain minimum value in order to become effective and this characteristic of points is commonly referred to as the onset threshold field intensity of the points. This condition is not especially objectionable in discharging precipitation charge from the aircraft because the onset threshold of the points is definitely lower than the portions of the aircraft from which current is liable to discharge directly. However, when using the points to detect and locate electrical cross fields, more sensitive operation is preferred. It is, therefore, a further object of this invention to charge the aircraft with just enough current to overcome the onset thresholds of the points. As a result, the points will operate immediately to indicate the presence of an electric field and, if desired, the intensity of the field may be measured by merely connecting a meter in circuit with each point.

The foregoing, as well as other objects, will be made more apparent as this description proceeds, especially when considered in connection with the accompanying drawings, wherein.

Figure 1:
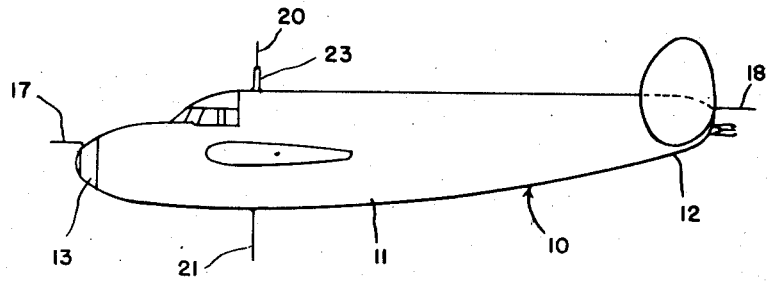
Figure 1 is a side elevational view of an aircraft equipped with electrical discharge apparatus constructed and arranged in accordance with this invention.
Figure 2:
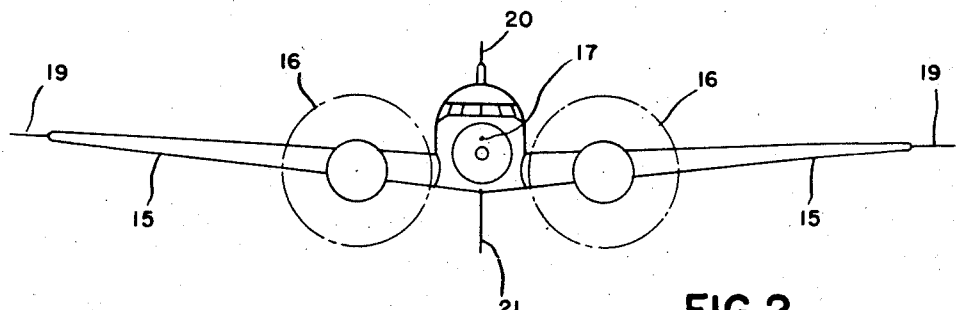
Figure 2 is a front elevational view of the construction shown in Figure 1.

In Figures 1 and 2 of the drawings, I have illustrated a conventional airplane 10 comprising a fuselage 11, a tail portion 12, a nose portion 13, and a pair of wings 15, respectively, extending laterally outwardly from opposite sides of the fuselage. In accordance with orthodox design, a motor is mounted on each wing and a propeller 16 is driven by each motor.

It is well established that modern aircraft relies to a great extent upon clear radio reception for safe and accurate navigation. It is also common knowledge that static materially interferes with radio reception and that under certain conditions of flight, the radio interference becomes so critical that the radio is rendered useless. It has been stated above that this so-called static is due to two somewhat different conditions which will be referred to herein as: (1) True precipitation charging; and (2) cross field corona. It has also been pointed out above that precipitation charging is caused by an aircraft flying into an area of charged particles which deposit an electrical charge on the aircraft. The current, resulting from the electrical charge on the aircraft, is discharged from the latter and if the discharge of this current is not controlled, it may reach such proportions as to cause interference with radio reception aboard the aircraft.

The so-called cross field corona is very different from precipitation static and is much more critical. This phenomenon is usually encountered when aircraft is flown in a region containing one or more electrically charged clouds and may be considered to be due to an electrical field applied to the aircraft. This electrical field is a source of currents both to and from the aircraft. The value of the electrical currents flowing to and from the aircraft increases as the aircraft approaches the charged clouds and usually exceeds the value known to cause serious interference with radio reception.

Although the present invention concerns itself more particularly with the problem of avoiding radio interference from cross field corona, nevertheless, the equipment for accomplishing this result is also operative to eliminate the effects of precipitation charging on radio reception. This phase of the problem is described in detail in the Bennett et al. copending application, Serial No. 402,040, filed July 11, 1941. However, in order to assist understanding the present invention, reference will be briefly made to the operation of the equipment for removing precipitation charge.

In general, precipitation charge is removed from the aircraft by strategically locating a plurality of pointed rods at different portions of the aircraft in such a manner that the electrical charge on the aircraft will discharge from the points rather than from the adjacent portions of the aircraft. As will be presently described, the discharge from the pointed ends of the rods is accordingly controlled so that a given electrical charge on the aircraft is equally divided between the number of pointed rods and so that the value of current discharged from any one point is below the value known to cause interference with radio reception.

With the above in view, reference is again made to the drawings wherein it will be noted that at least one sharp pointed rod or discharge point is mounted on each of the following portions of the aircraft: the nose 13, the tail 12, each of the wing tips, the top of the fuselage and the bottom of the fuselage. The sharp pointed rods at the above locations are respectively designated in the drawings by the reference characters 17, 18, 19, 20 and 21. It will, of course, be understood that additional points or sharp pointed rods similar to the one illustrated may be placed at other portions of the aircraft which are liable to release charge and, therefore, the number as well as the location of the sharp pointed rods will depend to some extent on the particular design of the aircraft to be equipped.

In the present illustrated embodiment of the invention, the pointed rods 17 and 18 respectively extend outwardly beyond the nose and tail portions of the aircraft, while the pointed rods 19 extend outwardly beyond the wing tips of the aircraft. The pointed rods 20 and 21 extend vertically for a substantial distance above and below the fuselage. The length of the rods 20 and 21 is such that the pointed ends project beyond the tips of the propeller blades when the latter assume their vertical positions. The arrangement is such that the points 20 and 21 will project to a greater extent than the propeller blades into the electrical field above and below the aircraft and will operate to discharge electricity which would ordinarily be discharged from the propeller tips.

Regardless of the particular locations of the pointed rods on the aircraft, the installation must be such that a given electrical charge on the aircraft is discharged from the points in such a manner that the value of current discharged from any one point is not only substantially equal to the value of the current discharged from any one of the other points but is also less than the value of current known to interfere with radio reception. Therefore, it is important to control the amount of current discharged from any one of the pointed rods and this may be accomplished by varying: (1) The length of the sharp pointed rods with respect to the adjacent portions of the aircraft; (2) The included angle of the pointed ends of the rods or, in other words, the sharpness of the points; and (3) The degree of hooding of the points.

With respect to the length of the pointed rods, attention is called to the fact that each pointed rod must have a minimum length which is sufficient to insure electrical discharge from the pointed ends of the rods rather than from the adjacent portions of the aircraft. However, due to the fact that certain portions of the aircraft will draw more current than other portions, it is necessary to increase the length of certain of the pointed rods with respect to the other rods so that the discharge current will be equally divided between the number of rods. In the event that the current drawn by any one portion of the aircraft exceeds the amount capable of being discharged from the adjacent pointed rod without causing radio interference, additional pointed rods may be provided at this location in such a manner that the current will be divided equally between these rods.

In some installations, it may be necessary to extend a pointed rod a substantial distance from the adjacent portion of the aircraft in order to avoid electrical discharge from the latter portion of the aircraft and at the same time to limit the current discharged from this point. An instance of this character is shown in connection with the pointed rod 20 which extends from the top of the fuselage 11. This condition is compensated for by hooding the pointed end of the rod with a member 23. Thus, by properly hooding a pointed rod, the current discharged from a point may be varied without decreasing the extent to which the rod projects into the surrounding electrical field.

The degree of sharpness or the included angle of the pointed rods is also important in obtaining a radio silent condition. In practically all cases, the pointed ends of the rods should be needle sharp because it has been found that the discharge from sharp points is more steady and less disruptive. For this reason, it is important to carefully select the material from which the pointed rods are formed so that the rods will withstand the weather without excessive oxidation, particularly at the points of the rods. Satisfactory results have been obtained by forming the rods of steel and by plating the pointed ends of the points with chromium or rhodium or some other material characterized in that it will protect the ends from excessive oxidation.

Figure 3:
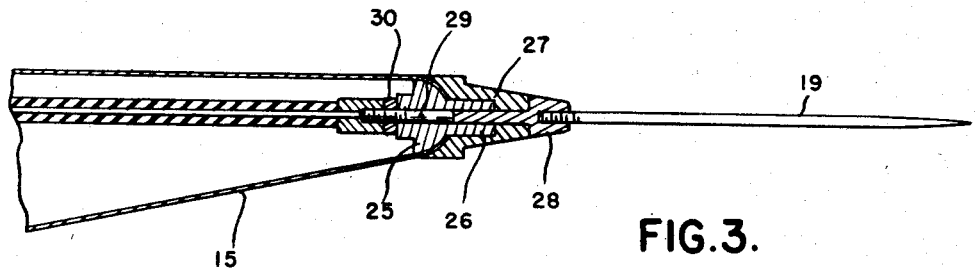
Figure 3 is a sectional view showing one method that may be employed to secure the pointed rods to the aircraft.

In Figure 3 of the drawings I have illustrated a typical mounting for one of the pointed rods. More particularly, the mounting for the rod 19 on the wing tip 15 is shown. In detail, a clamp 25 is supported in the wing tip and is provided with a reduced portion 26 which extends laterally through an opening in the edge of the wing tip. The reduced portion 26 projects into a recess formed in a block 27 of insulating material and the latter engages the outer skin of the wing opposite the clamp 25. A stud 28 has a reduced shank 29 which extends through the block 27 and clamp 25. The inner end of the shank 29 is threaded for receiving a clamping nut 30 and the head of the stud has a threaded bore for receiving the inner end of the pointed rod 19. This general type of mounting may be used for all of the pointed rods and the block of insulating material 27 may be employed as a hood for the point if desired. In the case of the pointed rod 20, the block of insulated material and associated parts may be made longer so as to provide the desired hooding for this point.

Figure 4:
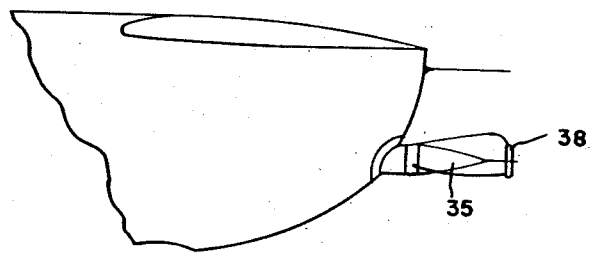
Figure 4 is a fragmentary side elevational view of the tail portion of the aircraft.
Figures 6, 7:
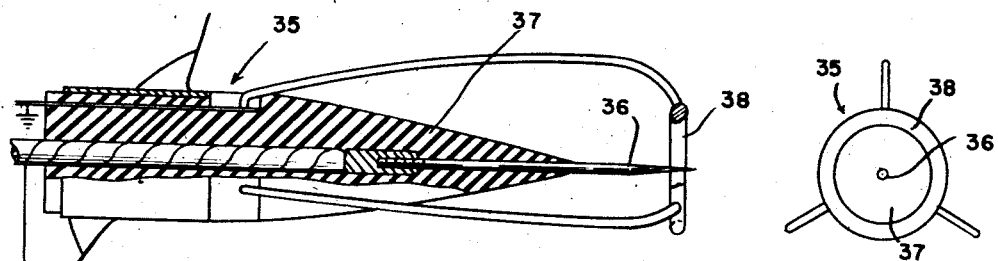
Figure 6 is a sectional view showing the apparatus employed for placing an electrical charge on the aircraft.
Figure 7 is an end elevational view of the construction shown in Figure 6.

In order to initially adjust all of the points on the aircraft to obtain the desired discharge from these points, I provide means for putting an electrical charge on the aircraft. This means comprises a charger 35 secured on the tail portion 12 of the aircraft in the manner clearly shown in Figure 4. The charger 35 comprises a discharge point 36 having the inner end secured in a conical-shaped holder 37 of insulating material. The holder 37 is suitably secured to the tail portion 12 of the aircraft and supports a target electrode 38 in the form of a ring which surrounds the tip of the discharge electrode 36 in the manner shown in Figure 6. The forward end of the discharge point 36 is electrically connected to the output of a suitable rectifier 39 supported in the cabin of the aircraft and capable of energizing the points with a high voltage direct current. The target electrode 38 is grounded on the aircraft and, as a result, a steady direct current discharge of ions takes place from the point 36 toward the target electrode 38.

The target electrode 38 is located in the air stream and the air passing through the electrode operates to blow the ions from the aircraft. For example, if the discharge current at the tip of the point 36 is between one hundred and two hundred microamperes, the field intensity through substantially one half of the radial gap is less than 5 k. v. per centimeter. At 5 k. v. per centimeter the velocity of ions may be considered to be approximately two hundred miles per hour, and for an airplane velocity of the same magnitude, the ions will be blown to the rear and, due to the rapidly diminishing field intensities, are blown completely away from the airplane.

The particular polarity of the charge left on the airplane will, of course, depend upon the polarity of the direct current applied to the point 36 by the rectifier 39. In the present instance, I prefer to energize the point 36 with a negative potential so that negative ions are blown off of the airplane and a positive charge is left on the airplane. Assuming that a precipitation charge of positive potential is applied to the aircraft, it will be noted that this charge merely adds to the charge placed on the aircraft by the charger and is removed by the pointed rods. On the other hand, if the precipitation charge deposited on the aircraft has a negative polarity, this charge merely tends to neutralize some of the positive charge placed on the aircraft by the charger and, consequently, does not interfere with the normal operation of the pointed rods previously described.

It follows from the above that the charger 35 may be operated to put a given charge on the aircraft and thereby permits initially adjusting the length, hooding, number and locations of the pointed rods so that the same value of current may be discharged from the point on each rod and so that this value of current will be below the value known to cause radio interference. This adjustment is effected under fair weather conditions of flight and when properly made, the equipment will operate satisfactorily to remove precipitation charge from the aircraft without causing interference to radio reception. It will, of course, be understood that when making the above adjustments, a meter M is electrically connected to each pointed rod in the manner indicated in Figure 5 so that the current discharged by each rod may be readily ascertained.

Referring now to the cross field corona condition briefly described above, it will be noted as this description proceeds that the present invention contemplates minimizing the danger resulting from this condition by warning the pilot of the existence of an intense electrical field and by indicating the location of this field with respect to the aircraft so as to enable the pilot to navigate around the storm or highly charged area. In general, the existence of an electrical field or charged cloud is conveyed to the pilot by means of electrically operated signals connected in circuit with the points and operated by the currents passing to and from the aircraft. Hence, the sensitivity of the pointed rods is important in indicating electrical fields, and in order to improve the sensitivity of the pointed rods, the latter are energized by the charger 35 with just enough current to overcome the onset thresholds or field intensities of the pointed rods.

Figure 5:
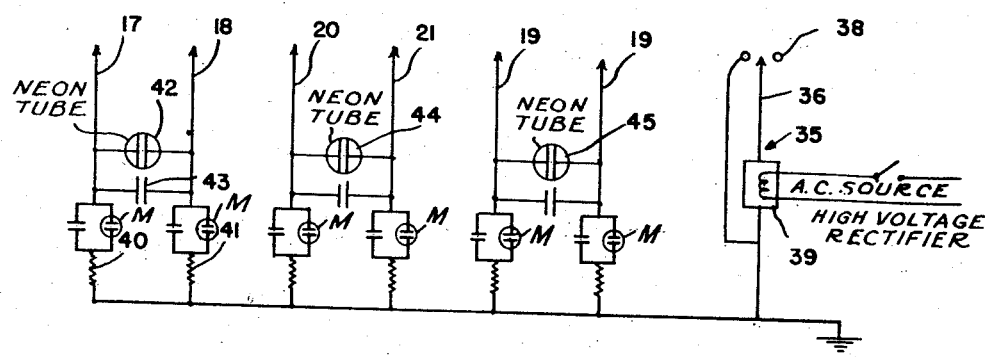
Figure 5 is a wiring diagram showing the indicating circuit employed in connection with the pointed rods.

With the above in view, attention is called to Figure 5 of the drawings wherein it will be noted that the pointed rods 17 and 18 are electrically connected to ground through the medium of resistances 40 and 41 respectively. An electrically operated signal in the form of a gas filled tube 42 is connected across the pointed rods 17, 18 and a condenser 43 is also electrically connected across the pointed rods so as to discharge through the tube 42. The fuselage points 20 and 21 as well as the points on the wing tips are respectively electrically connected to ground in the same manner as the points 17 and 18.

Although the voltage of the output rectifier 39, value of the resistances 40 and 41, capacity of the condenser 43 and type of the gas filled tubes 42, 44 and 45 may all vary in accordance with different conditions, nevertheless, a satisfactory operating condition has been obtained by employing the following specifications. The voltage of the output rectifier 39 depends largely on how fast and how high it is desired to charge the aircraft with the charger 35. Satisfactory operation has been obtained with output voltages in the range of ten to twenty thousand volts. The value of the resistances 40 and 41 and the capacity of the condensers 43 depends on the desired sensitivity of the warning signal circuits. The resistances are not particularly critical and may be varied between one to five hundred megohms in cases where the condenser capacity is .01 Mfd. In connection with the types of gas filled tubes employed, it has been found that "RCA #991 neon" tubes operate satisfactorily.

It follows from the foregoing that currents passing to the nose and tail points 17 and 18, respectively, flow through the resistors 40 and 41 respectively. As long as the current consists only of a uniform charging current supplied only by the charger 35 plus a greater or less amount of precipitation charging, or, in other words, when each point is discharging the same amount of current as the other points, the voltage across the signal tube 42 is zero. However, as soon as there is any electrical field applied to the nose or tail of the aircraft, the current from one of the discharge points is suppressed by the field, resulting in a voltage applied to the signal tube 42. This condition causes the condenser 43 to discharge through the signal tube 42 in a manner to repeatedly give a warning series of flashes in the tube which become a continuous illumination for strong fields. Thus, if the aircraft is approaching an electrical field, the point 17 draws a current and energizes the signaling tube 42. As the aircraft approaches the electrical field, the value of the current drawn by the point 17 increases and the periodicity of the flashes in the signaling tube 42 correspondingly increase until the current becomes sufficient to continuously illuminate the signaling tube 42. This gives sufficient warning to the pilot that the aircraft is approaching a complicated storm area and enables the pilot to navigate around the storm area or to land the aircraft at the nearest airport. In the event that the charged cloud or electrical field is above or below the aircraft, either the point 20 or the point 21 energizes the signaling tube 44 in the same manner as described above. On the other hand, if the highly charged cloud or electrical field is on either side of the aircraft, one of the wing tip points energizes the signaling tube 45 to indicate the location of this charged area. Thus, regardless of the location of the storm area, provision is made for detecting the same and the sensitivity of the points is such that a warning is given to the pilot in ample time for him to navigate around the storm area or to land the aircraft before the electrical field is able to seriously effect the navigation of the aircraft.

What I claim as my invention is:

1. Aircraft having a part adapted to conduct electricity, sharp pointed rods projecting from the aircraft and adapted to be energized by a difference of potential between the aircraft and atmosphere, means for respectively electrically grounding the rods on the part aforesaid of the aircraft through resistances, a condenser connected across the rods, and a signaling device electrically connected across the condenser.

2. Aircraft having a point projecting therefrom and adapted to be energized by an electric field in the region of flight of the aircraft, means for supplying sufficient current to the point to overcome the onset threshold thereof and thereby increase the sensitivity of the point to electric fields, and means for indicating energization of the point by an electric field in the general vicinity of the aircraft.

3. Aircraft having a part adapted to conduct electricity, points projecting outwardly from different portions of said part of the aircraft and adapted to be energized by a difference in potential between the aircraft and the surrounding medium, said points having an electrical resistance connection with the part aforesaid of the aircraft and being adjusted to discharge equal amounts of current, means for putting an electric charge on the electrically conducting part of the aircraft to supply sufficient current to the points to overcome the onset threshold of the points, an electrically operated signal connected across the points, and a condenser connected across the signal.

4. In an airplane having nose, tail and wing portions, points projecting outwardly from the nose and tail portions, a second set of points projecting outwardly from the top and bottom portions of the aircraft, a third set of points projecting outwardly from the wing tips of the aircraft, said points adapted to be energized by electric fields in the region of flight of the aircraft and each point adapted to discharge the same value of current, means for supplying sufficient current to the points to overcome the onset thresholds of the points, an electrically operated signal associated with each set of points, and means respectively electrically connecting the signals to the sets of points and operable to maintain substantially zero voltage across the signals as long as said points discharge equal amounts of current.

5. In aircraft adapted to carry a charge of electricity, an electric conducting element projecting from and grounded on the aircraft, means for placing an electric charge on the aircraft to supply the current to the conductor element required to overcome the onset threshold characteristic thereof and thereby increase the sensitivity of the element to electric fields in the vicinity of the aircraft, and means for indicating energization of the said element by an electric field in the general vicinity of the aircraft.

6. In aircraft adapted to carry a charge of electricity, a plurality of electric discharge members grounded on those parts of the aircraft from which charges of electricity are most likely to escape when a difference of potential exists between the aircraft and atmosphere and adapted to be energized by an electric field in the general vicinity of the aircraft, and means for indicating energization of the members by an electric field in the vicinity of the aircraft.

7. In aircraft of the type adapted to carry an electric charge, a plurality of pointed rods extending outwardly from the portions of the aircraft from which electric charges are most likely to escape, each pointed rod having a potential drop so determined with respect to the potential drop of the other rods that substantially the same amount of current is discharged by each rod when a potential difference exists between the aircraft and surrounding medium, said rods also being sensitive to electric fields in the general vicinity of the aircraft and adapted to be energized thereby, and means for indicating energization of one or more of the pointed rods by an electric field in the general vicinity of the aircraft.

8. In aircraft of the type adapted to carry an electric charge, a plurality of pointed rods extending outwardly from the portions of the aircraft from which electric charges are most likely to escape, each pointed rod having a potential drop so determined with respect to the potential drop of the other rods that substantially the same amount of current is discharged by each rod when a potential difference exists between the aircraft and surrounding medium, means for supplying sufficient current to each rod to overcome the onset threshold characteristics thereof and thereby increase the sensitivity of the rods to electrical fields in the general vicinity of the aircraft, and means for indicating energization of the pointed rods by an electric field and for also indicating the general direction of the field from the aircraft.

9. Aircraft having points projecting outwardly therefrom and adapted to be energized by an electric field in the region of flight of the aircraft, each point having a potential drop so determined with respect to the potential drop of the other points that substantially the same amount of current is discharged by each point when a difference of potential exists between the aircraft and surrounding medium, means for supplying sufficient current to the points to substantially overcome the onset threshhold characteristics of the points, an electrically operated signal, and means electrically connecting the signal to the points and operable to maintain substantially zero voltage across the signal when the points are passing equal amounts of current and to effect operation of the signal upon energization of one or more of the points by an electric field in the general vicinity of the aircraft.

10. Aircraft having a plurality of electric conductor elements projecting therefrom in different directions and adapted to be energized by an electric field in the region of flight of the aircraft, means for supplying current to the conductor elements to overcome the onset threshold characteristics thereof and thereby increase the sensitivity of the conductor elements to electric fields in the general vicinity of the aircraft, and means for indicating the element or elements energized by the electric field to thereby indicate the direction of the electric field from the aircraft.

11. Aircraft having a plurality of sets of electric conductor elements projecting therefrom in different directions and each element having a potential drop so determined with respect to the potential drop of the other elements that substantially the same amount of current is discharged by each element when a difference of potential exists between the aircraft and surrounding atmosphere, means for supplying sufficient current to the conductor elements to overcome the onset threshold characteristics of said elements and thereby increase the sensitivity of the elements to electric fields in the general vicinity of the aircraft, an electrically operated signal for each set of conductor elements, and means respectively electrically connecting the signals to the sets of conductor elements to indicate energization thereof by electric fields and operable to maintain substantially zero voltage across the signals when the conductor elements are passing substantially equal amounts of current.

12. In aircraft of the type adapted to carry an electric charge, a plurality of electric discharge elements grounded on and projecting outwardly from the aircraft in different directions, each discharge element having a potential drop so determined with respect to the potential drop of the other elements that substantially the same amount of current is discharged by each element when a difference of potential exists between the aircraft and surrounding medium, said discharge elements also being sensitive to electric fields in the general vicinity of the aircraft and adapted to be energized thereby, and means for indicating energization of the elements by an electric field and for also indicating the general direction of the field from the aircraft including signals respectively electrically connected to the discharge elements.

13. Aircraft having a plurality of sets of electric conductor elements projecting therefrom in different directions and each element having a potential drop so determined with respect to the potential drop of the other elements that substantially the same amount of current is discharged by each element when a difference of potential exists between the aircraft and surrounding atmosphere, said elements also being sensitive to electric fields in the general vicinity of the aircraft and adapted to be energized by the fields, an electrically operated signal for each set of elements, and means respectively electrically connecting the signals to the sets of elements to indicate energization thereof by electric fields and operable to maintain substantially zero voltage across the signals when the conductor elements are passing substantially equal amounts of current.

14. Aircraft having points projecting outwardly from the portions of the aircraft from which electric charges are most likely to escape and adapted to be energized by electric fields in the general vicinity of the aircraft, each point having a potential drop so determined with respect to the potential drop of the other points that substantially the same amount of current is discharged by each point when a difference of potential exists between the aircraft and surrounding medium, an electrically operated signal, and means electrically connecting the signal to the points and operable to maintain substantially zero voltage across the signal when the points are passing equal amounts of current and to thereby effect operation of the signal upon energization of one or more of the points by an electric field in the region of the aircraft.

WILLARD H. BENNETT.